United States Patent
Beskrovny et al.

(10) Patent No.: US 9,032,530 B2
(45) Date of Patent: *May 12, 2015

(54) CORRECTING WORKFLOW SECURITY VULNERABILITIES VIA STATIC ANALYSIS AND VIRTUAL PATCHING

(71) Applicant: International Business Machines Corporation, Armonk, NY (US)

(72) Inventors: Evgeny Beskrovny, Ramat Gan (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/629,745

(22) Filed: Sep. 28, 2012

(65) Prior Publication Data
US 2014/0096255 A1    Apr. 3, 2014

(51) Int. Cl.
*G06F 11/00*    (2006.01)
*G06F 21/57*    (2013.01)

(52) U.S. Cl.
CPC ................... *G06F 21/577* (2013.01)

(58) Field of Classification Search
None
See application file for complete search history.

(56) References Cited

U.S. PATENT DOCUMENTS

| | | | |
|---|---|---|---|
| 7,237,265 B2 * | 6/2007 | Reshef et al. | 726/25 |
| 7,761,917 B1 | 7/2010 | Kumar | |
| 7,779,399 B2 * | 8/2010 | Huang et al. | 717/154 |
| 8,132,164 B1 * | 3/2012 | Horovitz et al. | 717/169 |
| 8,250,654 B1 * | 8/2012 | Kennedy et al. | 726/22 |
| 8,621,639 B1 | 12/2013 | Pennington et al. | |
| 8,656,370 B2 | 2/2014 | Murthy et al. | |
| 2002/0083211 A1 * | 6/2002 | Driesner et al. | 709/311 |
| 2006/0277539 A1 * | 12/2006 | Amarasinghe et al. | 717/168 |
| 2009/0144827 A1 * | 6/2009 | Peinado et al. | 726/25 |
| 2009/0300764 A1 * | 12/2009 | Freeman | 726/24 |
| 2010/0083240 A1 | 4/2010 | Siman | |
| 2010/0281248 A1 | 11/2010 | Lockhart et al. | |
| 2011/0126288 A1 * | 5/2011 | Schloegel et al. | 726/25 |
| 2011/0131656 A1 | 6/2011 | Haviv et al. | |
| 2012/0311715 A1 * | 12/2012 | Tal et al. | 726/25 |
| 2013/0086688 A1 | 4/2013 | Patel et al. | |
| 2013/0091578 A1 * | 4/2013 | Bisht et al. | 726/25 |
| 2014/0096258 A1 | 4/2014 | Beskrovny et al. | |

OTHER PUBLICATIONS

Balzarotti, D. et al., "Multi-Module Vulnerability Analysis of Web-Based Applications," CCS '07 Proc. of the 14th ACM Conf. on Computer and Communications Security, pp. 25-35, 2007.

(Continued)

*Primary Examiner* — Shewaye Gelagay
*Assistant Examiner* — Khoi Le
(74) *Attorney, Agent, or Firm* — Cuenot, Forsythe & Kim, LLC

(57) ABSTRACT

A computer program can be statically analyzed to determine an order in which client side workflows are intended to be implemented by the computer program. A virtual patch can be generated. When executed by a processor, the virtual patch can track web service calls from a client to the computer program, and determine whether the order of the web service calls from the client to the computer program correlate to the order in which client side workflows are intended to be implemented by the computer program. If the order of the web service calls from the client to the computer program do not correlate to the order in which client side workflows are intended to be implemented by the computer program, an alert can be generated.

9 Claims, 3 Drawing Sheets

(56) References Cited

OTHER PUBLICATIONS

Jovanovic, N. et al., "PIXY: A Static Analysis Tool for Detecting Web Application Vulnerabilities," 2006 IEEE Sym. on Security and Privacy, 6 pgs., May 21-24, 2006.

Shahriar, H., "Mitigating and monitoring Program Security Vulnerabilities," PhD. Thesis, School of Computing, Queen's University, 74 pgs., Jun. 17, 2010.

Naik, N. et al., "Effective Static Race Detection for Java," In PLDI '06, Proc. of 2006 ACM SIGPLAN Conf. on Programming Language Design and Implementation, vol. 4, No. 6, pp. 308-319, Jun. 2006.

Cova, M. et al., "Swaddler: an approach for the anomaly-based detection of state violations in web applications," In Proc. of Int'l Sym. on Recent Advances in Intrusion Detection (RAID), pp. 63-86, 2007.

Tripp, O. et al., "TAJ: effective taint analysis of web applications," [online] in PLDI '09 Proc. of 2009 ACM SIGPLAN Conf. on Programming Language Design and Implementation, vol. 44, No. 6, pp. 87-97, 2009, retrieved from the Internet: <researcher.watson.ibm.com/files/us-msridhar/pldi153-tripp.pdf>.

\* cited by examiner

_US 9,032,530 B2_

1

CORRECTING WORKFLOW SECURITY VULNERABILITIES VIA STATIC ANALYSIS AND VIRTUAL PATCHING

BACKGROUND

Arrangements described herein relate to correcting workflow vulnerabilities.

Virtual patching is a popular means of dealing with security vulnerabilities in web applications. When a new vulnerability is discovered, the developers may respond to it by issuing a security patch. This is motivated by the amount of time it takes to develop a fix, test it and install, which may be quite long. In the meantime, the patch ensures the safety of the software system in the presence of the vulnerability. Moreover, a virtual patch allows administrators to review, test and schedule official patch updates without leaving the system at risk in the intervening period.

Unlike traditional patching, virtual patching allows an application to be patched without changing program code of the application, its libraries, the operating system, or even the system it is running on. Virtual patching aims to fix a problem by controlling either the inputs into, or outputs from, the application. A common method of implementing a virtual patch is to place some type of a proxy or in-line packet manipulator in front of the application to control the inputs or outputs from the application.

BRIEF SUMMARY

One or more embodiments disclosed within this specification relate to correcting workflow security vulnerabilities.

An embodiment can include a system having a first processor. The first processor can be configured to initiate executable operations. The executable operations can include statically analyzing client side code of a computer program to determine an order in which client side workflows are intended to be implemented by the computer program. Based on the static analysis, a virtual patch can be generated. The virtual patch can be configured to, when executed by the first processor or a second processor, perform executable operations. The executable operations can include tracking web service calls from a client to the computer program, and determining whether the order of the web service calls from the client to the computer program correlate to the order in which client side workflows are intended to be implemented by the computer program. The executable operations further can include, responsive to determining that the order of the web service calls from the client to the computer program do not correlate to the order in which client side workflows are intended to be implemented by the computer program, generating an alert. The virtual patch can be configured to be applied to a processing system hosting the computer program.

Another embodiment can include a computer program product for correcting workflow security vulnerabilities. The computer program product can include a computer-readable storage medium having stored thereon program code that, when executed, configures a first processor to perform executable operations. The executable operations can include statically analyzing client side code of a computer program to determine an order in which client side workflows are intended to be implemented by the computer program. Based on the static analysis, a virtual patch can be generated. The virtual patch can be configured to, when executed by the first processor or a second processor, perform executable operations. The executable operations can include tracking web service calls from a client to the computer program, and

2 determining whether the order of the web service calls from the client to the computer program correlate to the order in which client side workflows are intended to be implemented by the computer program. The executable operations further can include, responsive to determining that the order of the web service calls from the client to the computer program do not correlate to the order in which client side workflows are intended to be implemented by the computer program, generating an alert. The virtual patch can be configured to be applied to a processing system hosting the computer program.

DETAILED DESCRIPTION

Figure 1:
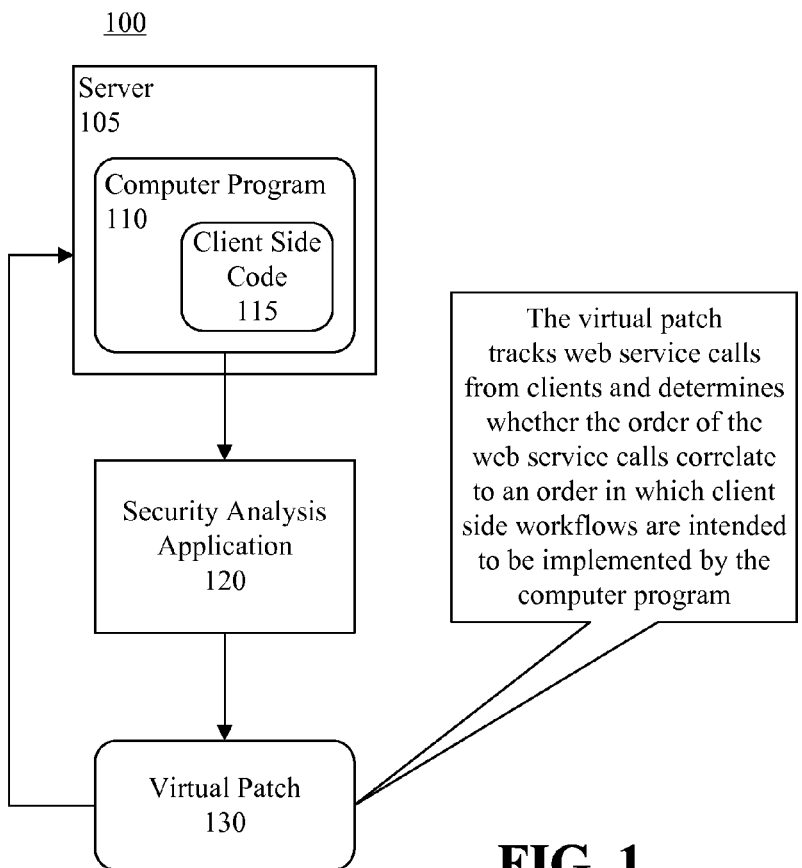
FIG. 1 is a flow diagram illustrating a method of correcting workflow security vulnerabilities in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to correcting workflow vulnerabilities, for example using static analysis and virtual patching. A static analysis can be applied to a computer program to analyze client side code of the computer program to determine an order in which client side workflows are intended to be implemented by the computer program. Based on the static analysis, a virtual patch can be generated and applied to monitor web service calls to the computer program. During client sessions established with client devices (hereinafter "clients"), web service calls from clients to the computer program can be tracked. For each client session, the virtual patch can determine whether an order of the web service calls from the client correlate to the order in which client side workflows are intended to be implemented by the computer program. Responsive to the virtual patch determining that the order of the web service calls from the client do not correlate to the order in which client side workflows are intended to be implemented by the computer program, the virtual patch can generating an alert indicating such. By using a virtual patch to validate web service calls in this manner, the computer program can be easily updated by applying the virtual patch to control inputs into and/or outputs from the computer program without need to update other code in the computer program. Thus, the virtual patch can be rapidly deployed without need for a significant amount of testing to be performed on the computer program.

As used herein, the term "virtual patch" means an application, module or function that is applied to monitor service calls to a computer program and which, when installed, does not change program code of the computer program or its libraries. For example, a virtual patch can be installed, or applied, to a web application firewall to perform a specific function or specific functions, and removed at any point without requiring that code in the computer program be changed in order to compensate for the removal of the virtual patch. That said, the virtual patch may be applied to address a specific security vulnerability or specific vulnerabilities, and when the virtual patch is removed, the code of the computer program may be updated to address the specific security vulnerability or vulnerabilities previously addressed by the virtual patch. Accordingly, the virtual patch may serve as a temporary fix, though this need not be the case.

FIG. 1 is a flow diagram 100 illustrating a method of correcting workflow security vulnerabilities in accordance with one embodiment disclosed within this specification. A server 105 (e.g., a web server), or other suitable processing system, can host a computer program 110, such as a web application. The computer program 110 can be analyzed by a security analysis application 120 to determine whether one or more potential security vulnerabilities exists in client side code 115 of the computer program 110. As used herein, the term "client side code" means code of a computer program configured to be provided to a client during a client session. In illustration, client side code 115 can be contained in web pages of the computer program 110 that are configured for presentation to clients accessing the computer program 110. A security vulnerability exists in the client side code 115 if the client side code 115 is susceptible to malicious use by a client-side user.

Table 1 provides an example of client side code 115 that may be susceptible to malicious use:

TABLE 1

```
function purchaseBook(username, password, bookId( {
    // First authenticate the user.
    var authenticated = checkCredentials(username, password);
    if (authenticated == false) {
        alert("Authentication failure!");
        return; }
    var bookPrice = getBookPrice(bookId);
    // Then check the user's balance.
        if (getBalance(username)<bookPrice) {
            alert("Not enough money!");
            return; }
    // Finally, perform the billing and download the book.
    debitAccount(username);
    downloadBook(bookId); }
```

In this example of client side code 115, each of the required operations (e.g., steps) of a transaction is not encapsulated as a single public function. Instead, there is a plurality of client side operations. Thus, the client side code 115 may introduce a security vulnerability to the computer program 110; a user may attempt to circumvent one or more of the operations from being performed, or cause the client side code to be executed in a manner other than the manner in which the client side code 115 is intended to be executed.

Using static analysis, the security analysis application 120 can track dependence and atomicity of the operations contained in the client side code 115 to determine whether a security vulnerability exists in the client side code 115. The security analysis application 120 can identify a security vulnerability if, for example: (i) there is a sequence of operations chained in the client side code 115 by program dependencies (e.g., data and/or control dependencies), (ii) data dependencies chaining the operations emanate from data sources (i.e., statements reading user-provided inputs), or (iii) the sequence of operations contains strict or contiguous subpaths that satisfy items (i) and/or (ii). Because a static analysis may be used, the computer program 110 need not be instrumented with instrumentation code to perform the analysis, which simplifies the analysis process. In performing the static analysis, for each web page, the security analysis application 120 can generate a control flow diagram representing the client side workflow, and these client side workflows can be analyzed.

If a security vulnerability is identified in the client side code 115, the security analysis application 120 further can analyze the client side code 115 to determine an order in which client side workflows are intended to be implemented by the computer program 110. For example, the security analysis application 120 can analyze the control flow diagrams to determine, for each web page, an order in which the client side workflows are intended to be implemented by the computer program 110. For example, the security analysis application 120 can identify a safe set of candidate approximations for each client side workflow, and automatically synthesize metadata that records sensitive execution paths. The sensitive execution paths can be those identified by the security analysis application 120 as being potentially vulnerable to malicious use of the computer program 110 by a user participating in a client session.

If the security analysis application 120 identifies a security vulnerability within one or more of the client side workflows, the security analysis application 120 can generate a virtual patch 130 to address such security vulnerability (or vulnerabilities). The virtual patch 130 can, for example, include the metadata pertaining to the sensitive execution paths. The virtual patch 130 can be applied (e.g., installed) to the server 105 to validate web service calls from clients intended to be communicated to the computer program 110. For example, the virtual patch can be applied to a web application firewall, or applied as a stand-alone application on the server 105.

The virtual patch 130 can be configured to track web service calls from clients directed to the computer program 110, and determine whether the order of the web service calls correlate to the order in which client side workflows are intended to be implemented by the computer program 110. If in a particular client session the web service calls do not correlate to the order in which client side workflows are intended to be implemented by the computer program 110, the virtual patch 130 can generate an alert. In response to the alert, the virtual patch 130 (or web application firewall) can invalidate the client session, thus preventing the web service calls. When the client session is invalidated, web service calls generated in the client session can be blocked from being communicated to the computer program 110. In this regard, the virtual patch 130 (or web application firewall) also can terminate of the client session. Further, the virtual patch 130 can generate a response to the client indicating that an invalid input was received and/or that the client session is being terminated. In one arrangement, the virtual patch 130 can identify an IP address of the client and add the IP address to a black list of the web application firewall, thus blocking the client from establishing future client sessions with the computer program 110.

Figure 2:
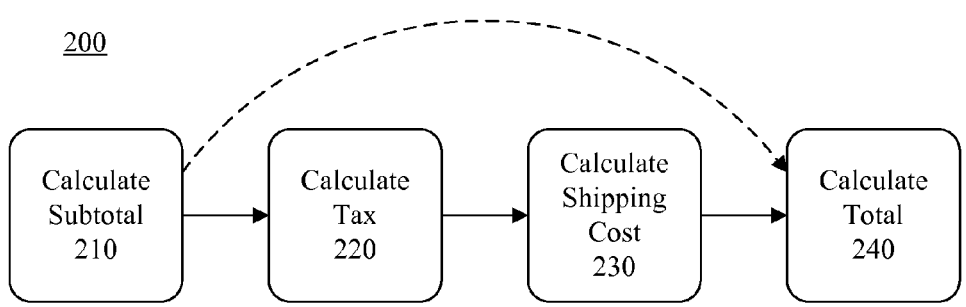
FIG. 2 is a flow diagram illustrating an example series of operations requested to be performed by a computer program in accordance with an embodiment disclosed within this specification.

FIG. 2 is a flow diagram 200 illustrating an example series of operations 210, 220, 230, 240 requested to be performed by the computer program 110 in accordance with an embodiment disclosed within this specification. The operations 210-240 are requested via web service calls from the client to the computer program 110. The web service calls 210 can correspond to statements contained in the client side code 115, and represent operations as they are intended to be performed by the computer program 110. In this non-limiting example, the operations include operations 210-240 directed to completing a purchase transaction via a website provided by the computer program 110. Specifically, the example operations can include a calculate subtotal operation 210, a calculate tax operation 220, a calculate shipping cost operation 230 and a calculate total operation 240. In accordance with the arrangements described herein, when generating the virtual patch 130, the security analysis application 120 can identify the order in which the operations 210-240 are to be performed. Optionally, the security analysis application 120 can identify the total number of operations 210-240.

A malicious user may attempt to circumvent one or more of the operations 210-240 by manipulating, at the client, the client side code 115. For example, the user may attempt to manipulate the client side code 115 to skip the calculate tax operation 220 and/or the calculate shipping cost operation 230. When a web service call corresponding to the operation calculate subtotal 210 is received from the client, the virtual patch 130 can identify such operation. When a second web service call is received from the client, the virtual patch 130 can determine whether the second service call corresponds to the calculate tax operation 220, which should follow the calculate subtotal operation 210. If not, the virtual patch 130 can generate an alert. When a third web service call is received from the client, the virtual patch 130 can determine whether the third service call corresponds to the calculate shipping cost operation 230, which should follow the calculate tax operation 220. If not, the virtual patch 130 can generate an alert. When a fourth web service call is received from the client, the virtual patch 130 can determine whether the third service call corresponds to the calculate total operation 240, which should follow the calculate shipping cost operation 230. Again, if not, the virtual patch 130 can generate an alert. Further, the virtual patch 130 can generate an alert if the total number of operations implemented by the web service calls is less than the total number of operations 210-240.

In some instances, other non-related web service calls may be received, for example if a user navigates to an information menu, navigates to another page, etc. Such web service calls can be ignored by the virtual patch 130 so long as such other web service calls do not interfere with the ability of the virtual patch 130 to verify that each of the operations 210-240 occur in the correct order and that data processed in such operations is not lost or changed by such other web service calls unless, of course, the purchase transaction is canceled.

Figure 3:
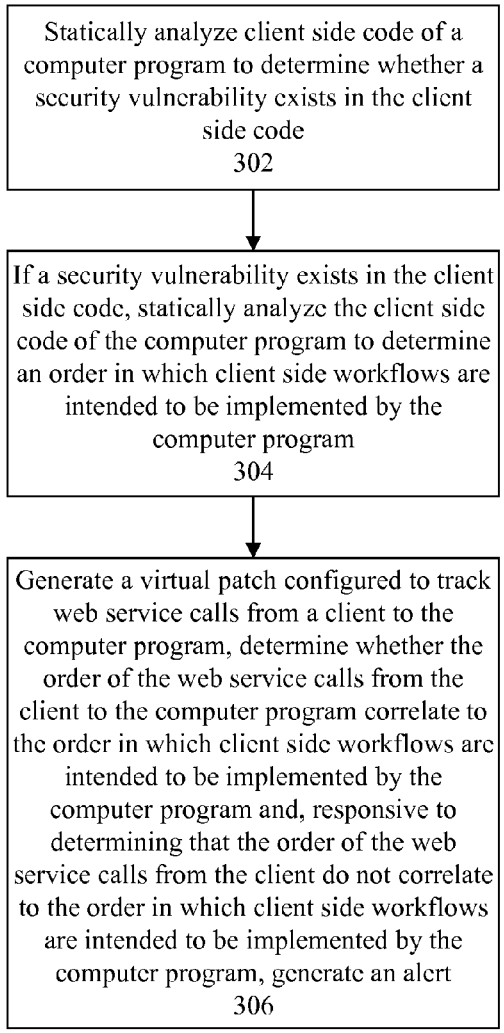
FIG. 3 is a flow chart illustrating a method of correcting workflow security vulnerabilities in accordance with an embodiment disclosed within this specification.

FIG. 3 is a flow chart illustrating a method 300 of correcting workflow security vulnerabilities in accordance with an embodiment disclosed within this specification.

At step 302, client side code of a computer program can be statically analyzed to determine whether a security vulnerability exists in the client side code. For example, a static analysis can be performed on web pages configured for presentation by the computer program to a client device. The static analysis can include identifying a safe set of candidate approximations of the client side workflows. Further, metadata that records sensitive execution paths can be automatically synthesized.

At step 304, responsive to determining the at least one security vulnerability exists in the client side code of the computer program, the client side code of the computer program can be statically analyzed to determine an order in which client side workflows are intended to be implemented by the computer program.

At step 306, a virtual patch can be generated to address the security vulnerability. The virtual patch can be configured to track web service calls from a client to the computer program, determine whether the order of the web service calls from the client to the computer program correlate to the order in which client side workflows are intended to be implemented by the computer program and, responsive to determining that the order of the web service calls from the client do not correlate to the order in which client side workflows are intended to be implemented by the computer program, generate an alert. In this regard, the metadata that records sensitive execution paths can be included in the virtual patch.

At step 308, the virtual patch can be configured to be applied to a processing system hosting the computer program, such as a server or other suitable processing system. In one arrangement, the virtual patch can be applied to a web application firewall. In another arrangement, the virtual patch can be applied as an application installed onto the processing system.

Figure 4:
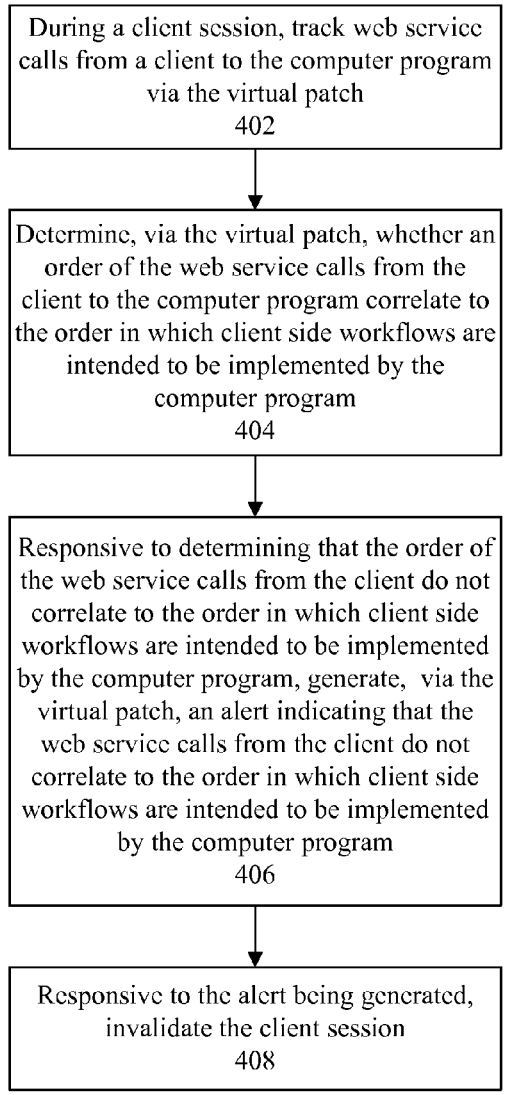
FIG. 4 is a flow chart illustrating a method of correcting workflow security vulnerabilities in accordance with another embodiment disclosed within this specification.

FIG. 4 is a flow chart illustrating a method 400 of correcting workflow security vulnerabilities in accordance with another embodiment disclosed within this specification.

At step 402, during a client session, web service calls from a client to the computer program can be tracked via the virtual patch.

At step 404, via the virtual patch, a determination can be made as to whether an order of the web service calls from the client to the computer program correlate to the order in which client side workflows are intended to be implemented by the computer program.

At step 406, responsive to determining that the order of the web service calls from the client do not correlate to the order in which client side workflows are intended to be implemented by the computer program, via the virtual patch, an alert can be generated indicating that the web service calls from the client do not correlate to the order in which client side workflows are intended to be implemented by the computer program.

At step 408, responsive to the alert being generated, the client session can be invalidated. For example, the virtual patch or the web application firewall can invalidate the user session. When the user session is invalidated, web service calls generated in the client session can be blocked from being communicated to the computer program. In one arrangement, the when the user session is invalidated, the client session can be terminated.

Figure 5:
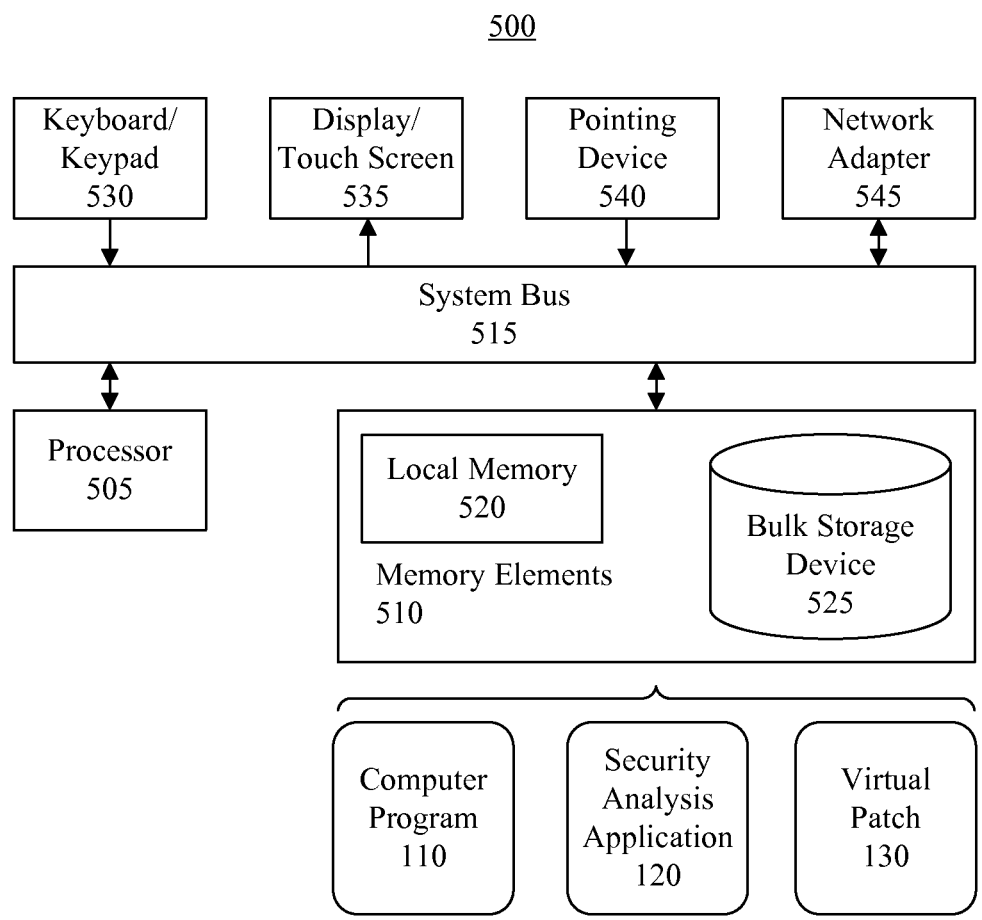
FIG. 5 is a block diagram illustrating a processing system that corrects workflow security vulnerabilities in accordance with an embodiment disclosed within this specification.

FIG. 5 is a block diagram illustrating a processing system 500 that corrects workflow security vulnerabilities in accordance with an embodiment disclosed within this specification.

The processing system 500 can include at least one processor 505 coupled to memory elements 510 through a system bus 515 or other suitable circuitry. As such, the processing system 500 can store program code within the memory elements 510. The processor 505 can execute the program code accessed from the memory elements 510 via the system bus 515. It should be appreciated that the processing system 500 can be implemented in the form of any system including a processor and memory that is capable of performing the functions and/or operations described within this specification. For example, the processing system 500 can be implemented as a compute (e.g., a desktop computer, a workstation, a mobile computer, a laptop computer, a tablet computer, a server, or the like), a smart phone, a personal digital assistant, or any other suitable processing system.

The memory elements 510 can include one or more physical memory devices such as, for example, local memory 520 and one or more bulk storage devices 525. Local memory 520 refers to RAM or other non-persistent memory device(s) generally used during actual execution of the program code. The bulk storage device(s) 525 can be implemented as a hard disk drive (HDD), solid state drive (SSD), or other persistent data storage device. The processing system 500 also can include one or more cache memories (not shown) that provide temporary storage of at least some program code in order to reduce the number of times program code must be retrieved from the bulk storage device 525 during execution.

Input/output (I/O) devices such as a keyboard and/or keypad 530, a display and/or touch screen 535, a pointing device 540 and a network adapter 545 can be coupled to the processing system 500. The I/O devices can be coupled to the processing system 500 either directly or through intervening I/O controllers. For example, the display/touchscreen 535 can be coupled to the processing system 500 via a graphics processing unit (GPU), which may be a component of the processor 505 or a discrete device. The network adapter 545 also can be coupled to processing system 500 to enable processing system 500 to become coupled to other systems, computer systems, remote printers, and/or remote storage devices through intervening private or public networks. Modems, cable modems, and Ethernet cards are examples of different types of network adapters 545 that can be used with processing system 500.

As pictured in FIG. 5, the memory elements 510 can store the components of the processing system 500, such as the security analysis application 120. Being implemented in the form of executable program code, the security analysis application 120 can be executed by the processing system 500 and, as such, can be considered part of the processing system 500. In one arrangement, the memory elements 510 can store the computer program 110 analyzed by the security analysis application 120 to determine whether the computer program 110 has security vulnerabilities. In another arrangement, the processing system can access the computer program 110 from another system to which the processing system is communicatively linked, for example via the network adapter 545.

During the security analysis, the security analysis application 120 can statically analyze the client side code of the computer program 110 to determine whether at least one security vulnerability exists in the client side code of the computer program 110. If so, the security analysis application 120 further can statically analyze the client side code to determine an order in which client side workflows are intended to be implemented by the computer program 110, and generate the virtual patch 130 described herein.

In one arrangement, the virtual patch 130 can be executed by the processing system 500 to validate the web service calls from clients. In another arrangement, the virtual patch 130 can be executed by another processing system on which the computer program 110 is executed to validate the web service calls. Such other processing system also can include a processor, memory elements, a system bus, and a network adapter, similar to those described herein. In this regard, the virtual patch 130 can be generated by a first processing system, and installed onto, and executed by, a second processing system. In this scenario, the computer program 110 can be live on the second processing system, but accessed by the first processing system, or perhaps even installed onto the first processing system, for purposes of analysis and generating the virtual patch 130.

In one embodiment, the security analysis application 120 can be implemented as IBM® Rational® AppScan (IBM and Rational are trademarks of International Business Machines Corporation in the United States, other countries, or both). The present arrangements are not limited in this regard, however.

Like numbers have be used to refer to the same items throughout this specification. The flowcharts, flow diagram and block diagram in the Figures illustrate the architecture, functionality, and operation of possible implementations of systems, methods and computer program products according to various embodiments of the present invention. In this regard, each block in the flowcharts, flow diagram or block diagram may represent a module, segment, or portion of code, which comprises one or more executable instructions for implementing the specified logical function(s). It should also be noted that, in some alternative implementations, the functions noted in a block may occur out of the order noted in the figures. For example, two blocks shown in succession may, in fact, be executed substantially concurrently, or the blocks may sometimes be executed in the reverse order, depending upon the functionality involved. It will also be noted that each block of the flowcharts, flow diagram and/or block diagram illustration, and combinations of blocks in the flowcharts, flow diagram and/or block diagram illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:
1. A system comprising:
a first processor and memory configured to initiate executable operations comprising:
determining an order in which client side workflows are intended to be implemented by the computer program by performing a static analysis of client side code of a computer program;
based on the static analysis, generating a virtual patch configured to, when executed by the first processor or a second processor, perform executable operations comprising:

tracking web service calls from a client to the computer program;

determining whether the order of the web service calls from the client to the computer program correlate to the order in which client side workflows are intended to be implemented by the computer program; and responsive to determining that the order of the web service calls from the client to the computer program do not correlate to the order in which client side workflows are intended to be implemented by the computer program, generating an alert indicating that the web service calls from the client do not correlate to the order in which client side workflows are intended to be implemented by the computer program; and configuring the virtual patch to be applied to a processing system hosting the computer program and applying the patch to the processing system hosting the computer program;

identifying a safe set of candidates of the client side workflows; and automatically synthesizing metadata that records sensitive execution paths and including the metadata in the virtual patch.

2. The system of claim 1, wherein the processor further is configured to initiate executable operations comprising:

determining whether at least one security vulnerabilities exists in the client side code of the computer program by performing a static analysis of the client side code of the computer program;

wherein determining an order in which client side workflows are intended to be implemented by the computer program is responsive to determining the at least one security vulnerability exists in the client side code of the computer program.

3. The system of claim 1, wherein determining the order in which client side workflows are intended to be implemented by the computer program comprises:

performing a static analysis on web pages configured for presentation by the computer program via a client device.

4. The system of claim 1, wherein the processor further is configured to initiate executable operations comprising:

responsive to the alert being generated, invalidating the client session.

5. The system of claim 4, wherein invalidating the client session comprises:

blocking web service calls generated in the client session from being communicated to the computer program.

6. The system of claim 4, wherein invalidating the client session comprises:

terminating the client session.

7. computer program product for correcting workflow security vulnerabilities, the computer program product comprising:

a computer-readable storage device, wherein the computer-readable storage device is not a transitory, propagating signal per se, having stored thereon program code that, when executed, configures a first processor to perform executable operations comprising:

determining an order in which client side workflows are intended to be implemented by the computer program by performing a static analysis of client side code of a computer program; and based on the static analysis, generating a virtual patch configured to, when executed by the first processor or a second processor, perform executable operations comprising:

tracking web service calls from a client to the computer program;

determining whether the order of the web service calls from the client to the computer program correlate to the order in which client side workflows are intended to be implemented by the computer program; and responsive to determining that the order of the web service calls from the client to the computer program do not correlate to the order in which client side workflows are intended to be implemented by the computer program, generating an alert indicating that the web service calls from the client do not correlate to the order in which client side workflows are intended to be implemented by the computer program; and configuring the virtual patch to be applied to a processing system hosting the computer program and applying the patch to the processing system hosting the computer program;

identifying a safe set of candidates of the client side workflows; and automatically synthesizing metadata that records sensitive execution paths and including the metadata in the virtual patch.

8. The computer program product of claim 7, wherein the executable operations further comprise:

determining whether at least one security vulnerability exists in the client side code of the computer program by performing a static analysis of the client side code of the computer program;

wherein determining an order in which client side workflows are intended to be implemented by the computer program is responsive to determining the at least one security vulnerability exists in the client side code of the computer program.

9. The computer program product of claim 7, wherein determining an order in which client side workflows are intended to be implemented by the computer program comprises:

performing a static analysis on web pages configured for presentation by the computer program via a client device.

* * * * *